United States Patent
Usa et al.

(10) Patent No.: US 8,031,436 B2
(45) Date of Patent: Oct. 4, 2011

(54) ELECTRON BEAM WRITING METHOD FOR MAGNETIC RECORDING MEDIUM

(75) Inventors: Toshihiro Usa, Odawara (JP); Kazunori Komatsu, Odawara (JP)

(73) Assignee: Fujifilm Corporation, Tokyo (JP)

( * ) Notice: Subject to any disclaimer, the term of this patent is extended or adjusted under 35 U.S.C. 154(b) by 342 days.

(21) Appl. No.: 12/393,117

(22) Filed: Feb. 26, 2009

(65) Prior Publication Data
US 2009/0212230 A1    Aug. 27, 2009

(30) Foreign Application Priority Data
Feb. 26, 2008    (JP) .................................. 2008-043758

(51) Int. Cl.
*G11B 5/82*    (2006.01)
(52) U.S. Cl. .................... 360/135; 250/396 R; 430/296; 430/942
(58) Field of Classification Search .................. 369/126, 369/127, 120, 13.01, 121; 360/135; 430/296, 430/942; 250/396 R, 397, 398, 400
See application file for complete search history.

(56) References Cited

U.S. PATENT DOCUMENTS

| 7,026,098 | B2 | 4/2006 | Komatsu et al. |
| 7,663,124 | B2* | 2/2010 | Kasono et al. ............. 250/492.1 |
| 2009/0140162 | A1* | 6/2009 | Komatsu et al. .......... 250/396 R |
| 2009/0140163 | A1* | 6/2009 | Komatsu et al. .......... 250/396 R |
| 2009/0194711 | A1* | 8/2009 | Usa et al. .................... 250/492.3 |
| 2009/0242788 | A1* | 10/2009 | Komatsu et al. .......... 250/396 R |
| 2010/0237262 | A1* | 9/2010 | Usa et al. .................... 250/492.3 |
| 2011/0053088 | A1* | 3/2011 | Usa et al. ...................... 430/296 |

FOREIGN PATENT DOCUMENTS
JP    2003-248981    9/2003
* cited by examiner

*Primary Examiner* — Tan X Dinh
(74) *Attorney, Agent, or Firm* — Young & Thompson

(57) ABSTRACT

When performing writing on a substrate applied with a resist by rapidly vibrating electron beam in a direction orthogonal to a radial direction of the substrate and X-Y deflecting the electron beam while rotating the substrate in one direction, a long element is written by scanning the electron beam with the middle position of a 2-bit signal length as the center position of the electron beam so as to completely fill the area of the writing length reduced by a predetermined ratio and an unwritten portion of predetermined width remaining on each side of the long element with respect to a final 2-bit signal length on a magnetic disk medium.

9 Claims, 5 Drawing Sheets ered as "0" appears more than convex portions corresponding to "1" appears more than convex portions cor-
ELECTRON BEAM WRITING METHOD FOR MAGNETIC RECORDING MEDIUM

BACKGROUND OF THE INVENTION

1. Field of the Invention

The present invention relates to an electron beam writing method and a fine pattern writing system for writing a fine pattern according to a desired uneven pattern when manufacturing an imprint mold, magnetic transfer master substrate, or the like for a high density magnetic recording medium, such as a discrete track medium, bit pattern medium, or the like.

The invention also relates to a method for manufacturing an uneven pattern carrying substrate, including an imprint mold, magnetic transfer master substrate or the like, having an uneven pattern surface formed through a writing step performed by the electron beam writing method described above. The invention further relates to a method for manufacturing a magnetic disk medium having an uneven pattern transferred thereto from the uneven pattern carrying substrate or imprint mold, and a method for manufacturing a magnetic disk medium having a magnetic pattern transferred thereto from the magnetic transfer master substrate.

2. Description of the Related Art

A magnetic disk medium is provided with a fine pattern corresponding to servo signal, address signal, and the like by an uneven pattern, a magnetic pattern, or the like. As for the method for forming such fine patterns, an electron beam writing method in which a pattern is written on a substrate applied with a resist by irradiating an electron beam thereon while rotating the substrate is proposed as described, for example, in U.S. Pat. No. 7,026,098 and Japanese Unexamined Patent Publication No. 2003-248981.

The electron beam writing method described in U.S. Pat. No. 7,026,098 is a method in which when, for example, writing a rectangular or parallelogram element constituting a servo pattern extending in a track width direction, the electron beam is deflected in a radial direction while being vibrated rapidly in a circumferential direction, thereby scanning the beam so as to completely fill the area of the element.

The electron beam writing method described in Japanese Unexamined Patent Publication No. 2003-248981 is a method in which when, for example, writing elements of a recording bit string with a constant length in a track width direction and different lengths in a track direction, the electron beam is rapidly vibrated in a radial direction with the amplitude thereof being adjusted as the substrate is rotated.

Further, as on/off writing method, a method in which pattern writing is performed by on/off irradiating an electron beam on a substrate applied with a resist according to the shape of a pattern while rotating the substrate, and shifting the substrate or electron beam irradiation unit by one beam width every rotation of the substrate in a radial direction is also known.

FIG. 6 shows an example fine pattern to be recorded on a magnetic disk medium, such as a hard disk. The concentric tracks in an annular region of disk-shaped disk 1 excluding outer circumferential portion 1a and inner circumferential portion 1b are made up of a plurality of sectors, each including preformatted area 2 and data area 5. Preformatted area 2 includes, for example, preamble, address signal, burst signal, and the like recorded typically by a magnetic pattern (fine pattern) or the like. Preformatted areas 2 are formed in elongated areas extending substantially radially in each sector from the center at regular intervals with respect to concentric tracks of disk 1. Note that preformatted areas 2 in this example are formed in curved radial continued in radial directions.

A portion of preformatted area 2 recorded on disk 1 includes address information recorded by a fine pattern (magnetic pattern) like that shown, as an example, in FIG. 7. The address information is formed of a fine pattern that includes short rectangular elements 3 and long rectangular elements 4 disposed on concentric tracks T1 to T4 in a mixed fashion.

As illustrated in FIG. 8A in an enlarged form, short element 3 in preformatted area 2 (magnetic pattern) recorded on a magnetic disk medium corresponds to 1-bit signal length "T", and long element 4 has a track direction length corresponding to 2-bit signal length "2T".

FIG. 8B illustrates fine pattern 12 to be written on substrate 10 of the present invention, to be described later, by an electron beam when, for example, producing a master substrate for performing magnetic transfer recording on the magnetic disk medium described above. Writing lengths of short element 13 and long element 14 formed on the master substrate for magnetically transferring short element 3 and long element 4 to the magnetic disk medium are reduced by a predetermined ratio with respect to 1-bit signal length "T" and 2-bit signal length "2T" on the disk medium respectively, resulting in "kT" for short element 13 and "2kT" for long element 14. This is influenced by magnetization characteristic at the time of magnetic transfer (transfer bleeding) and size variation at the time of etching, and reduction ratio k varies depending on various conditions.

For a 2-bit signal, long writing element 14 of the present invention is written as an integrated rectangular element having a length of 2kT centered on the middle position of 2-bit signal length 2T.

That is, the following have been found out. When long element 14 is formed by writing short elements 13 in adjacent 1-bit signal areas, an unwritten gap (T-kT) will present between adjacent elements 13. Then, if a magnetic transfer master substrate is produced with this element and magnetic transfer is performed on a magnetic disk medium using the master substrate, an area having a different magnetic pole according to the gap will present in the middle portion of long element 4 shown in FIG. 8A in a magnetic pattern formed on the magnetic disk medium after the magnetic transfer, which poses a problem of address information readout error. In order to record long element 4 with 2-bit length 2T on a magnetic disk medium as an integrated signal, it is necessary to write long element 14 as one element with reduced writing length 2kT like that shown in FIG. 8B.

The fine pattern representing an address signal shown in FIG. 7 is an example of address information in a hard disk pattern after Manchester conversion. The Manchester conversion converts binary numbers "0" and "1" to "01" and "10" respectively, thus having always "1". Whereas, in dibit conversion, binary numbers "0" and "1" are converted to "00" and "01" respectively. That is, "1" does not appear in the second digit, and instead "0" appears more.

When address information in a hard disk pattern is converted by the dibit conversion and formed in an uneven pattern on a magnetic transfer master substrate, flat portions corresponding to "0" appears more than convex portions corresponding to "1" because "0" appears more. Consequently, if magnetic transfer is performing by bringing the master substrate and a magnetic disk medium into close contact with each other and applying a transfer magnetic field, flat portions other than convex portions of the master substrate, which normally do not brought into close contact with the magnetic disk medium, are brought into close contact with the surface of the medium, causing a problem that an erroneous signal is magnetically transferred to the disk medium. In view of this, it is proposed that information including address information be converted by Manchester conversion, which causes more convex portions to appear in an uneven pattern on a master substrate, for pre-formatting a magnetic disk medium by magnetic transfer.

In a signal train converted by Manchester conversion, a binary number "01" is converted to "0110", resulting in that "1" corresponding to a convex portion of a fine pattern appears in succession. Thus, when writing such a portion in the fine pattern, the adjacent short elements must be written as one long element as described above.

In the mean time, exposure bleeding occurs in electron beam exposure writing on a resist in which a portion wider than the portion actually scanned by the electron beam reacts and is exposed. Therefore, it is also necessary to reduce the exposure width scanned by the electron beam shorter than the actual signal length on the magnetic disk medium.

The electron beam writing methods disclosed in U.S. Pat. No. 7,026,098 and Japanese Unexamined Patent Publication No. 2003-248981 do not mention about a method for writing a long element like that described above, and there is a demand for a method capable of writing such a long element on a predetermined position accurately and rapidly.

In particular, writing of a fine pattern having short elements and long elements in a mixed fashion as described above has a problem that a long element representing "11", which should be written integrally, is written separately, having a gap in the middle, thereby causing faulty transfer or erroneous signal.

In view of the circumstances described above, it is an object of the present invention to provide an electron beam writing method capable of writing a reduced element having a predetermined exposure width in a track direction without a gap in the middle thereof for a fine pattern having short elements and long elements in a mixed fashion.

It is a further object of the present invention to provide a method for manufacturing an uneven pattern carrying substrate, such as an imprint mold or a magnetic transfer master substrate, having a fine pattern accurately written by an electron beam, and a method for manufacturing a magnetic disk medium using the uneven pattern carrying substrate in which an uneven pattern or a magnetic pattern is transferred from the uneven pattern carrying substrate to the magnetic disk medium.

SUMMARY OF THE INVENTION

An electron beam writing method of the present invention is a method for writing a fine pattern for a magnetic disk medium on a substrate applied with a resist and placed on a rotation stage by scanning an electron beam on the substrate while rotating the rotation stage, the fine pattern including writing elements having a track direction length greater than an irradiation diameter of the electron beam, wherein:

the fine pattern includes a short element corresponding to 1-bit signal length and a long element corresponding to 2-bit signal length in a mixed fashion, and the writing length of the long element is reduced by a predetermined ratio with respect to a final 2-bit signal length on the magnetic disk medium;

the writing of the fine pattern is performed by rapidly vibrating the electron beam back and forth in a direction orthogonal to a radial direction of the substrate and X-Y deflecting the electron beam in the radial direction of the substrate and the direction orthogonal to the radial direction while rotating the substrate in one direction, thereby scan controlling the electron beam so as to completely fill the shapes of the short and long elements in sequence; and when writing the long element, the electron beam is scanned with the middle position of the 2-bit signal length as the center position thereof so as to completely fill the area of the writing length reduced by the predetermined ratio, thereby writing the long element with an unwritten portion of predetermined width remaining on each side thereof with respect to a final 2-bit signal length on the magnetic disk medium.

the long element may be written by setting the amplitude of the back and forth vibration of the electron beam according to the entire writing length with the middle position of the 2-bit signal length as the center position thereof, and deflection scanning the electron beam once in the radial direction of the substrate.

Preferably, the amplitude of the back and forth vibration of the electron beam in the direction orthogonal to the radial direction is set by setting a writing signal reduced by a predetermined ratio with respect to the final signal length based on X-Y deflection signals in the radial direction and the direction orthogonal to the radial direction when the fine pattern is assumed to be written in the final signal arrangement on the magnetic disk medium.

Further, the long element may be written by setting the middle position of a halved writing length divided at the middle position of the 2-bit signal length as the center position of the back and forth vibration of the electron beam, setting the amplitude of the back and forth vibration of the electron beam to one-half of the writing length of the long element, and deflection scanning the electron beam twice in the radial direction of the substrate.

Preferably, the fine pattern is address information in a hard disk pattern after Manchester conversion.

A fine pattern writing system of the present invention is a system for realizing the electron beam writing method described above, including a signal output unit for outputting a write data signal and an electron beam writing unit for scanning an electron beam.

Preferably, the electron beam writing unit of the fine pattern writing system includes a rotation stage movable in a radial direction thereof while rotating a substrate applied with a resist, an electron gun that emits an electron beam, a deflection means that X-Y deflects the electron beam in a radial direction of the substrate and a direction orthogonal to the radial direction and rapidly vibrates the electron beam in the direction orthogonal to the radial direction, a blanking means that blocks the radiation of the electron beam other than a writing area, and a controller that performs associated operation control of each of the means, the signal output unit is a unit that outputs a write data signal to the controller of the electron beam writing unit based on data corresponding to the form of a fine pattern to be written on the substrate, and the controller is configured to scan control the electron beam, when writing the long element, so as to completely fill the long element with the middle position of the 2-bit signal length as the center position thereof and the unwritten portion of predetermined width remaining on each side thereof with respect to the final 2-bit signal length on the magnetic disk medium.

A method for manufacturing an uneven pattern carrying substrate of the present invention is a method including the steps of exposure writing a desired fine pattern on a substrate applied with a resist by the electron beam writing method described above, and forming an uneven pattern corresponding to the desired fine pattern on the substrate. Here, the uneven pattern carrying substrate is a substrate having thereon a desired uneven pattern, such as an imprint mold for transferring the shape of the uneven pattern to a magnetic disk medium, a magnetic transfer master substrate for transferring a magnetic pattern corresponding to the shape of the uneven pattern to a magnetic disk medium, or the like.

A first method for manufacturing a magnetic disk medium of the present invention is a method that uses an imprint mold produced through the steps of exposure writing a desired fine pattern on a substrate applied with a resist by the electron beam writing method described above and forming an uneven pattern corresponding to the desired fine pattern on the substrate to transfer an uneven pattern corresponding to the uneven pattern provided on the surface of the mold to the magnetic disk medium.

A second method for a magnetic disk medium of the present invention is a method that uses a magnetic transfer master substrate produced through the steps of exposure writing a desired fine pattern on a substrate applied with a resist by the electron beam writing method described above and forming an uneven pattern corresponding to the desired fine pattern on the substrate to transfer a magnetic pattern corresponding to the uneven pattern provided on the surface of the master substrate to the magnetic disk medium.

According to the electron beam writing method of the present invention, when sequentially writing elements of a fine pattern for a magnetic disk medium on a substrate by rapidly vibrating an electron beam back and forth in a direction orthogonal to a radial direction of the substrate and X-Y deflecting the electron beam in the radial direction of the substrate and the direction orthogonal to the radial direction to scan control the electron beam so as to completely fill the shapes of the short and long elements in sequence while rotating the substrate in one direction, in which the fine pattern includes a short element corresponding to 1-bit signal length and a long element corresponding to 2-bit signal length in a mixed fashion, and the writing length of the long element is reduced by a predetermined ratio with respect to a final 2-bit signal length on the magnetic disk medium, the long element is written by scanning the electron beam with the middle position of the 2-bit signal length as the center position thereof so as to completely fill the area of the writing length reduced by the predetermined ratio, thereby writing the long element with an unwritten portion of predetermined width remaining on each side thereof with respect to the final 2-bit signal length on the magnetic disk medium. This allows the long element to be written highly accurately and rapidly on a predetermined position in a predetermined form without a gap in the middle, whereby the cause of faulty transfer, erroneous signal and the like may be eliminated.

In particular, writing of the fine pattern by scan controlling the electron beam so as to completely fill the shapes of short and long elements by rapidly vibrating the electron beam in a direction orthogonal to a radial direction of a substrate and X-Y deflecting and moving the electron beam in the radial direction of the substrate and the direction orthogonal to the radial direction allows writing of a portion of the fine pattern corresponding to at least one track may be written rapidly and highly accurately during one rotation of the substrate.

Where the long element is written by setting the amplitude of the back and forth vibration of the electron beam according to the entire writing length with the middle position of the 2-bit signal length as the center position thereof, and deflection scanning the electron beam once in the radial direction of the substrate, the fine pattern may be written rapidly and accurately on the entire surface of the substrate, resulting in improved writing efficiency and reduced writing time.

In this case, if the amplitude of the back and forth vibration of the electron beam in the direction orthogonal to the radial direction is set by setting a writing signal reduced by a predetermined ratio with respect to the final signal length based on X-Y deflection signals in the radial direction and the direction orthogonal to the radial direction when the fine pattern is assumed to be written in the final signal arrangement on the magnetic disk medium, control for changing the reduction ratio and the like may be performed easily and accurately, resulting in a simplified control mechanism and speedy control.

Further, where the long element is written by setting the middle position of a halved writing length divided at the middle position of the 2-bit signal length as the center position of the back and forth vibration of the electron beam, setting the amplitude of the back and forth vibration of the electron beam to one-half of the writing length of the long element, and deflection scanning the electron beam twice in the radial direction of the substrate, the amplitude of the back and forth vibration of the electron beam becomes constant in the writing of the short element and the writing of the long element, so that the fine pattern may be written on the entire surface of the substrate only by the change control of the writing position, although the number of write times is increased.

In the mean time, the fine pattern writing system for realizing the electron beam writing method of the present invention includes a signal output unit for outputting a write data signal and an electron beam writing unit for scanning an electron beam, so that a desired fine pattern may be written rapidly and highly accurately, resulting in improved writing efficiency and reduced writing time.

In particular, a preferable system as the fine pattern writing system may be built in the following manner. That is, the electron beam writing unit includes a rotation stage movable in a radial direction thereof while rotating a substrate applied with a resist, an electron gun that emits an electron beam, a deflection means that X-Y deflects the electron beam in a radial direction of the substrate and a direction orthogonal to the radial direction and rapidly vibrates the electron beam in the direction orthogonal to the radial direction, a blanking means that blocks the radiation of the electron beam other than a writing area, and a controller that performs associated operation control of each of the means. The signal output unit is a unit that outputs a write data signal to the controller of the electron beam writing unit based on data corresponding to the form of a fine pattern to be written on the substrate. Here the controller is configured to scan control the electron beam, when writing the long element, so as to completely fill the long element with the middle position of the 2-bit signal length as the center position thereof and the unwritten portion of predetermined width remaining on each side thereof with respect to the final 2-bit signal length on the magnetic disk medium.

According to the method for manufacturing an uneven pattern carrying substrate of the present invention, the method includes the step of exposing a desired fine pattern on a substrate applied with a resist by the electron beam writing method described above and forming an uneven pattern thereon corresponding to the desired fine pattern. Thus, a substrate having thereon a highly accurate uneven pattern may be obtained easily.

According to the first method for manufacturing a disk medium of the present invention, a magnetic disk medium is manufactured using an imprint mold obtained through the steps of exposing a desired fine pattern on a substrate applied with a resist by the electron beam writing method described above and forming thereon an uneven pattern corresponding to the desired fine pattern to transfer an uneven pattern corresponding to the uneven pattern provided on the surface of the mold to the magnetic disk medium. In the case of the imprint mold, when performing shape patterning using imprint technology, the mold is pressed onto the surface of a resin layer serving as a mask in the manufacturing process of the magnetic disk medium and the pattern is transferred to the surface of the medium at a time, whereby a magnetic disk medium having excellent properties, such as a discrete track medium or a bit pattern medium, may be manufactured easily.

According to the second method for manufacturing a disk medium of the present invention, a magnetic disk medium is manufactured using a magnetic transfer master substrate obtained through the steps of exposing a desired fine pattern on a substrate applied with a resist by the electron beam writing method described above and forming thereon an uneven pattern corresponding to the desired fine pattern to magnetically transfer a magnetic pattern corresponding to the uneven pattern formed on the surface of the master substrate to the magnetic disk medium. In the case of the magnetic transfer master substrate, the substrate has thereon a fine pattern of a magnetic layer, so that a magnetic recording medium having excellent properties may be manufactured easily by bringing the master substrate into contact with the magnetic recording medium and applying a magnetic field thereto using magnetic transfer technology, and transfer forming a magnetic pattern corresponding to the pattern of the magnetic layer of the master substrate on the magnetic recording medium.

DESCRIPTION OF THE PREFERRED EMBODIMENTS

Figure 1A:
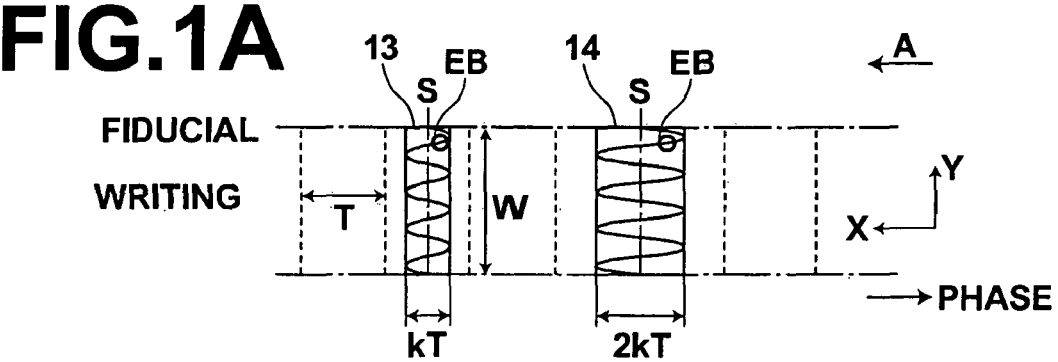
FIG. 1A is an enlarged schematic view illustrating a basic writing principle of long and short elements constituting a fine writing pattern in a first writing method of the present invention.
Figure 1B:
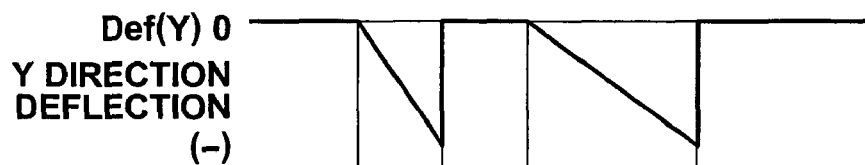
FIGS. 1B to 1E illustrate various signals, including a deflection signal and the like, used in the first writing principle shown in FIG. 1A.
Figure 1C:
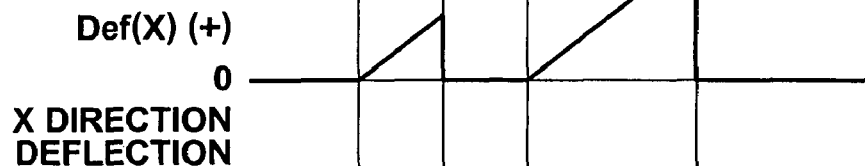
Figure 1D:
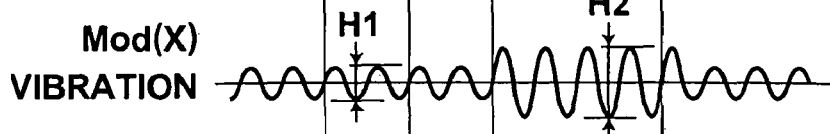
Figure 1E:
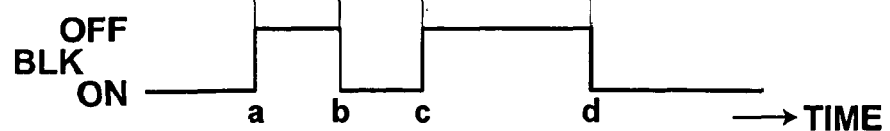
Figure 2A:
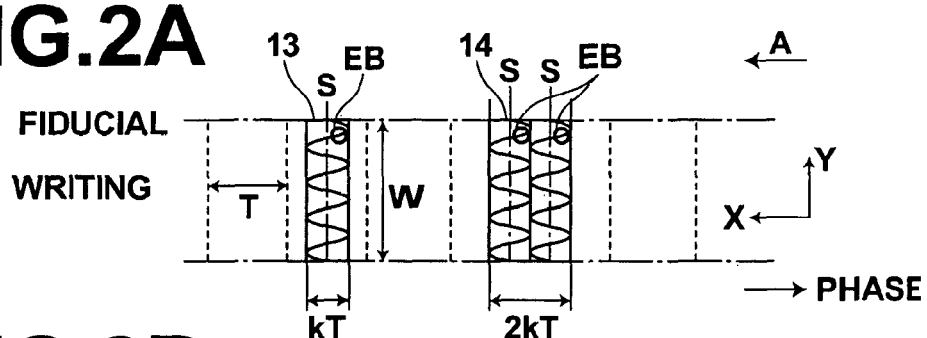
FIG. 2A is an enlarged schematic view illustrating a basic writing principle of long and short elements constituting a fine writing pattern in a second writing method of the present invention.

Hereinafter, exemplary embodiments of the present invention will be described in detail with reference to the accompanying drawings. FIG. 1A is an enlarged schematic view illustrating a basic writing principle of long and short elements constituting a fine pattern in a first writing method of the present invention, and FIGS. 1B to 1E illustrate various signals, including a deflection signal and the like, used in the first writing principle shown in FIG. 1A. FIG. 2A is an enlarged schematic view illustrating a basic writing principle of identical elements to those shown in FIG. 1A constituting a fine pattern in a second writing method of the present invention, and FIGS. 2B to 2E illustrate various signals, including a deflection signal and the like, used in the second writing principle shown in FIG. 2A.

<First Writing Method>

Figure 3A:
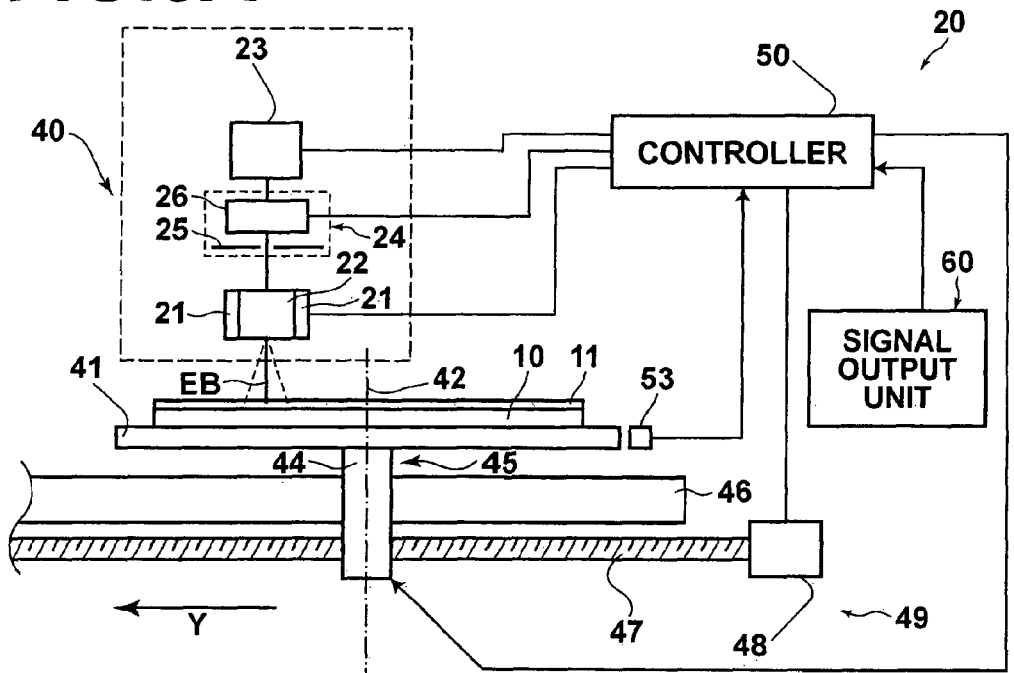
FIG. 3A is a relevant side view of a fine pattern writing system according to an embodiment for implementing the electron beam writing methods of the present invention.
Figure 3B:
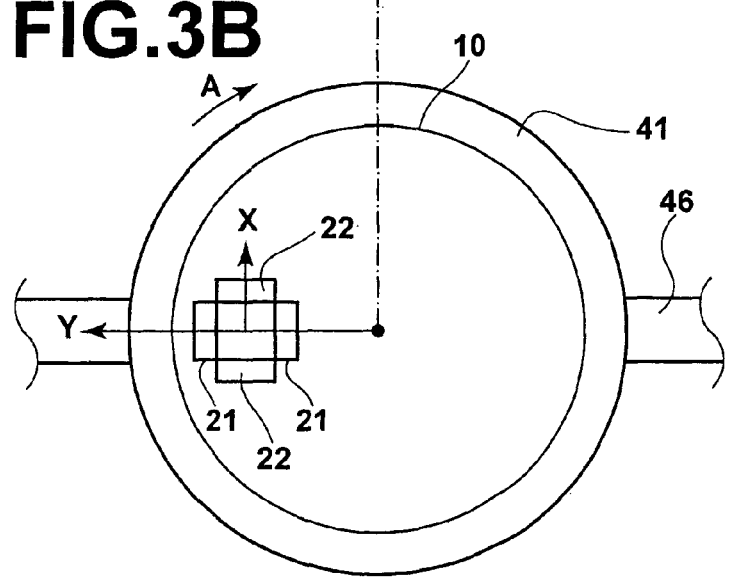
FIG. 3B is a partial plan view of the fine pattern writing system shown in FIG. 3A.
Figure 8A:
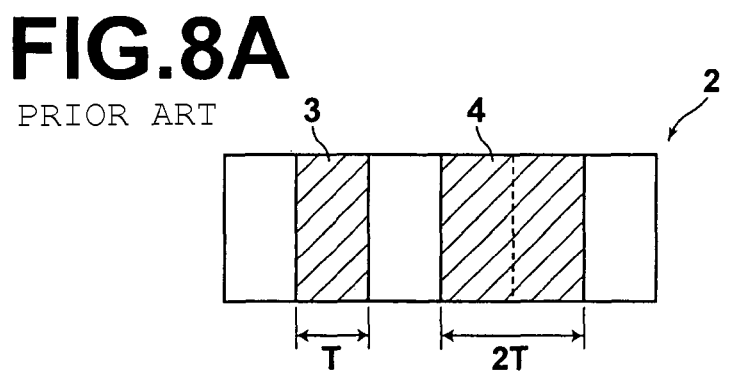
FIG. 8A is a partially enlarged view of a magnetic pattern recorded on a magnetic disk, illustrating short and long elements thereof.
Figure 8B:
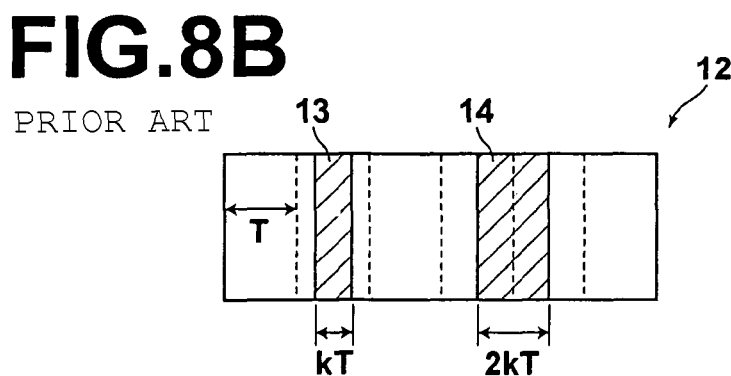
FIG. 8B is a partially enlarged view of a fine writing pattern written by an electron beam, illustrating short and long elements thereof.

FIG. 1A illustrates writing elements representing a portion of address signal converted by Manchester conversion as an example fine pattern written by electron beam EB on resist 11 applied on substrate 10 (FIGS. 3A and 3B) for writing a fine pattern, to be described later. The writing elements are short element 13 and long element 14 shown in FIG. 8B, having a width of one track width W and a track direction length greater than the irradiation diameter of electron beam EB. Short element 13 which corresponds to final 1-bit signal length T (FIG. 8A) has a writing length kT reduced by predetermined ratio "k", and long element 14 which corresponds to final 2-bit signal length 2T has a writing length 2kT reduced by predetermined ratio "k".

When writing long element 14, the first writing method scans electron beam EB with the middle position of 2-bit signal length 2T as the center position thereof so as to completely fill the area of writing length 2kT reduced by predetermined ratio "k", thereby writing long element 14 with an unwritten portion of predetermined width (T-kt) remaining on each side thereof. Here, long element 14 is written by setting amplitude H2 of the back and forth vibration of electron beam EB according to entire writing length 2kT with the middle position of 2-bit signal length 2T as the center position thereof, and deflection scanning electron beam EB once in radial direction Y of substrate 10.

Short element 13 and long element 14 are sequentially written during one rotation of substrate 10, in which the writing is performed by placing substrate 10 applied with resist 11 on rotation stage 41 (FIG. 3) to be described later, and while rotating substrate 10, sequentially scanning elements 13 and 14 with electron beam EB to radiation expose resist 11 one track or a plurality of tracks at a time from a track on the inner circumferential side to a track on the outer circumferential side or vice versa. That is, while substrate 10 is unidirectionally rotated in A direction, short element 13 and long element 14 are sequentially written at predetermined phase positions of concentric tacks (track width: W) which, when viewed microscopically, extends linearly in circumferential direction X orthogonal to radial direction Y at a time by scanning electron beam EB having a small diameter so as to completely fill the shapes thereof.

The scanning of electron beam EB is performed in the following manner. That is, while irradiating electron beam EB through ON/OFF operation of blanking means 24, to be described later, according to the writing area, electron beam EB is X-Y deflected in radial direction Y and circumferential direction X orthogonal to radial direction Y and rapidly vibrated back and forth in circumferential direction X orthogonal to radial direction Y at a constant amplitude according to the rotational speed of substrate 10 (rotation stage 41).

Writing lengths kT and 2kT of short and long elements are defined by amplitudes H1 and H2 of the back and forth vibration of electron beam EB in circumferential direction X of vibration signal Mod(X) shown in FIG. 1D to be described later. By adjusting amplitudes H1 and H2, the writing lengths can be reduced by any ratio with respect to 1-bit length T and 2-bit length 2T.

The X-Y deflection control is performed using Y direction deflection signal Def(Y) shown in FIG. 1B, X direction deflection signal Def(X) shown in FIG. 1C, and blanking signal BLK shown in FIG. 1E, to be described later, used when the writing lengths are not reduced, i.e., the short element and long elements are written with lengths of 1-bit length T and 2-bit length 2T respectively, and the writing lengths are changed only by changing amplitudes H1 and H2, thereby simplifying the control.

The writing will be described in detail with reference to FIGS. 1A to 1E. FIG. 1A illustrates the writing operation of electron beam EB in radial direction Y and circumferential direction X (rotational direction A), FIG. 1B illustrates deflection signal Def(Y) in radial direction Y, FIG. 1C illustrates deflection signal Def(X) in circumferential direction X, FIG. 1D illustrates vibration signal Mod (X) in circumferential direction X, and FIG. 1E illustrates ON/OFF operation of blanking signal BLK. The horizontal axis of FIG. 1A represents the phase of substrate 10, and the horizontal axes of FIGS. 1B to 1E represent time.

First, at point "a", blanking signal BLK (FIG. 1E) is turned OFF to start writing short element 13 by irradiating electron beam EB. While vibrating electron beam EB, placed at the write start position, back and forth in circumferential direction X with amplitude H1 corresponding to writing length kT with the middle position of 1-bit signal length T as its center position "s" by vibration signal Mod (X) (FIG. 1D), deflecting and moving electron beam EB in radial direction (-Y) by deflection signal Def (Y) (FIG. 1B), and at the same time deflecting and moving the electron beam in circumferential direction X which is the same direction as A direction by deflection signal Def(X) (FIG. 1C) in order to compensate for displacement of the irradiation position of electron beam EB arising from the rotation of substrate 10 in A direction, whereby electron beam EB is scanned so as to completely fill short rectangular servo element 13 with writing length kT. Then, at point "b", blanking signal BLK is turned ON to terminate the irradiation of electron beam EB and writing of short element 13. After point "b", the deflections in radial direction Y and circumferential direction X are returned to the fiducial position.

Next, as substrate 10 is rotated and reaches point "c", blanking signal BLK (FIG. 1E) is turned OFF to start writing long element 14 by irradiating electron beam EB. While vibrating electron beam EB, placed at the write start position, back and forth in circumferential direction X with amplitude H2 corresponding to writing length 2kT with the middle position of 2-bit signal length 2T as its center position "s" by vibration signal Mod (X) (FIG. 1D), deflecting and moving electron beam EB in radial direction (-Y) by deflection signal Def (Y) (FIG. 1B), and at the same time deflecting and moving electron beam in circumferential direction X which is the same direction as A direction by deflection signal Def (X) (FIG. 1C) in order to compensate for displacement of the irradiation position of electron beam EB arising from the rotation of substrate 10 in A direction, whereby electron beam EB is scanned so as to completely fill long rectangular servo element 14 with writing length 2kT. Then, at point "d", blanking signal BLK is turned ON to terminate the irradiation of electron beam EB and writing of long element 14. After point "d", the deflections in radial direction Y and circumferential direction X are returned to the fiducial position.

Note that when writing short and long elements 13 and 14, accurate positioning is performed at a plurality of write start points, such as points "a", "c", based on an encoder pulse signal to improve accuracy of the forming position of the servo patterns 12 in one round.

After writing for one track in one round, the writing is performed for the next track in the same manner as described above, thereby writing a desired fine pattern on the entire writing area of substrate 10. The track migration of writing position is performed by the deflection of electron beam EB in radial direction Y or linearly moving rotation stage 41, to be described later, in radial direction Y. The movement of electron beam may be performed for the writing of every plurality of tracks according to the deflectable range of electron beam EB in radial direction Y or for the writing of each track.

Deflection signal Def(X) in circumferential direction X allows writing of any parallelogram element by adjusting the magnitude, as well as compensation for the displacement of writing position arising from the rotation of rotation stage 41 when writing a rectangular element shown in FIG. 1A.

<Second Writing Method>

The second writing method shown in FIGS. 2A to 2E will now be described. In the second writing method, short element 13 is written in the same manner as in FIG. 1A to 1E. But long element 14 is written in the following manner. The middle position of halved writing length kT divided at the middle position of 2-bit signal length 2T is set as center position "s" of the back and forth vibration of electron beam EB, and writing length kT which is one-half of writing length 2kT of long element 14 is set to back and forth vibration amplitude H1. Then, deflection scanning is performed twice in a radial direction of substrate 10, whereby the area of writing length 2kT reduced by predetermined ratio "k" is completely filled by electron beam EB, whereby long element 14 is written with an unwritten portion of predetermined width (T-kt) remaining on each side thereof. In this case, back and forth vibration amplitude H1 of electron beam EB is constant throughout the writing of short element 13 and long element 14.

That is, long element 14 is written by writing short element 13 two times, but writing centers of short elements 13 are moved toward the center in order to avoid the formation of an unwritten gap in the central portion.

Figure 2B:
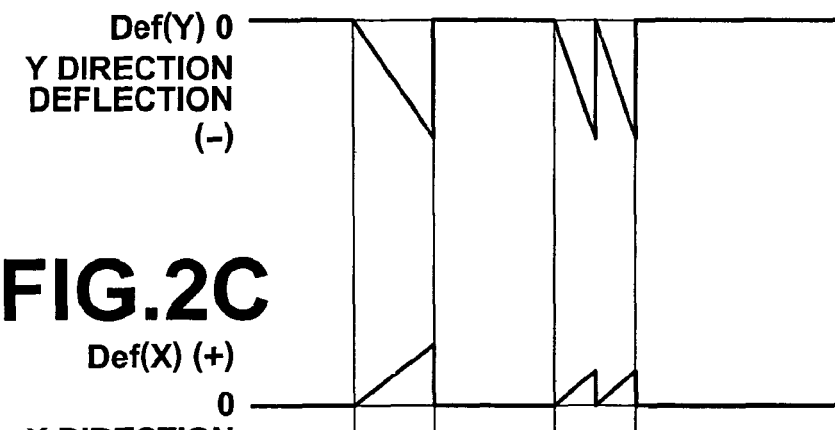
FIGS. 2B to 2E illustrate various signals, including a deflection signal and the like, used in the second writing principle shown in FIG. 2A.
Figure 2C:
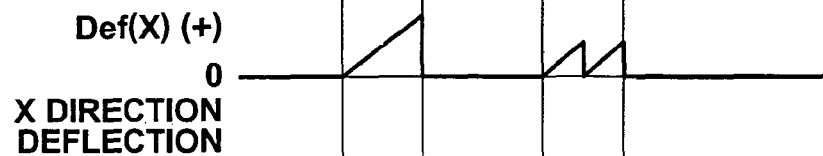
Figure 2D:
Figure 2E:
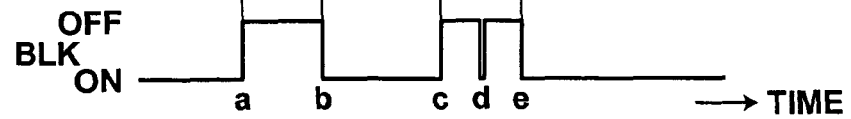

The writing will be described in detail with reference to FIGS. 2A to 2E. As in FIGS. 1A to 1E, FIG. 2A illustrates the writing operation of electron beam EB in radial direction Y and circumferential direction X (rotational direction A), FIG. 2B illustrates deflection signal Def (Y) in radial direction Y, FIG. 2C illustrates deflection signal Def (X) in circumferential direction X, FIG. 2D illustrates vibration signal Mod (X) in circumferential direction X, and FIG. 2E illustrates ON/OFF operation of blanking signal BLK. The horizontal axis of FIG. 2A represents the phase of substrate 10, and the horizontal axes of FIGS. 2B to 2E represent time.

First, at point "a", blanking signal BLK (FIG. 2E) is turned OFF to start writing short element 13 by irradiating electron beam EB. While vibrating electron beam EB, placed at the write start position, back and forth in circumferential direction X with amplitude H1 corresponding to writing length kT with the middle position of 1-bit signal length T as its center position "s" by vibration signal Mod (X) (FIG. 2D), deflecting and moving electron beam EB in radial direction (−Y) by deflection signal Def (Y) (FIG. 2B), and at the same time deflecting and moving the electron beam in circumferential direction X which is the same direction as A direction by deflection signal Def(X) (FIG. 2C) in order to compensate for displacement of the irradiation position of electron beam EB arising from the rotation of substrate 10 in A direction, whereby electron beam EB is scanned so as to completely fill short rectangular servo element 13 with writing length kT. Then, at point "b", blanking signal BLK is turned ON to terminate the irradiation of electron beam EB and writing of short element 13. After point "b", the deflections in radial direction Y and circumferential direction X are returned to the fiducial position.

Next, as substrate 10 is rotated and reaches point "c", blanking signal BLK (FIG. 2E) is turned OFF to start writing long element 14 by irradiating electron beam EB. A first deflection operation is performed in the following manner. While vibrating electron beam EB, placed at the write start position, back and forth in circumferential direction X with amplitude H1 corresponding to writing length kT in A direction from the middle position of 2-bit signal length 2T with middle position of writing length kT as its center position "s" by vibration signal Mod (X) (FIG. 2D), deflecting and moving electron beam EB in radial direction (−Y) by deflection signal Def (Y) (FIG. 2B), and at the same time deflecting and moving electron beam in circumferential direction X which is the same direction as A direction by deflection signal Def(X) (FIG. 2C) in order to compensate for displacement of the irradiation position of electron beam EB arising from the rotation of substrate 10 in A direction, whereby electron beam EB is scanned so as to completely fill one-half of long rectangular servo element 14 with writing length kT. Then, at point "d", blanking signal BLK is turned ON momentarily to terminate the irradiation of electron beam EB and, the deflections in radial direction Y and circumferential direction X are returned to the next write start position.

Electron beam EB is irradiated by turning OFF blanking signal BLK again at point "d", and the writing of the remaining half of long element 14 is started by a second deflection operation in the following manner. While vibrating electron beam EB, placed at the write start position, back and forth in circumferential direction X with amplitude H1 corresponding to writing length kT in −A direction from the middle position of 2-bit signal length 2T with the middle position of writing length kT as its center position "s" by vibration signal Mod (X) (FIG. 2D) identical to that in the first deflection operation, deflecting and moving electron beam EB in radial direction (−Y) by deflection signal Def (Y) (FIG. 2B), and at the same time deflecting and moving electron beam in circumferential direction X which is the same direction as A direction by deflection signal Def(X) (FIG. 2C) in order to compensate for displacement of the irradiation position of electron beam EB arising from the rotation of substrate 10 in A direction, whereby electron beam EB is scanned so as to completely fill the remaining half of long rectangular servo element 14 with writing length kT. Then, at point "e", blanking signal BLK is turned ON to terminate the irradiation of electron beam EB, the deflections in radial direction Y and circumferential direction X are returned to the fiducial position.

The intensity of electron beam EB is set to a value which is sufficient to expose resist 11 by the rapid vibration writing of fine pattern 12. That is, the writing width (real exposure width) tends to become wider than the irradiation beam diameter and amplitude according to the exposure time and amplitude. Therefore, the amplitude and deflection speed of electron beam EB are controlled so as to be scanned with a predetermined radiation dose corresponding to the writing width. Note that it is difficult to change beam intensity in the middle of writing from the viewpoint of beam stability.

In order to write each of elements 13 and 14 of fine pattern 12 described above, electron beam EB is scanned as described above. For scan controlling electron beam EB, a writing data signal is sent from signal output unit 60 (FIG. 3) to controller 50 of electron beam writing unit 40, to be described later. The timing and phase of the output signal are controlled based on the encoder pulse signal generated according to the rotation of rotation stage 41 and a reference clock signal.

In order to perform the writing described above, fine pattern writing system 20 shown in FIG. 3 is used. Fine pattern writing system 20 includes electron beam writing unit 40 and signal output unit 60. Electron beam writing unit 40 includes rotation stage unit 45 having rotation stage 41 that supports substrate 10 and spindle motor 44 having a motor axis aligned with central axis 42 of rotation stage 41; shaft 46 passing through a portion of rotation stage unit 45 and extending in radial direction Y of rotation stage 41; and linear moving means 49 that moves rotation stage unit 45 along shaft 46. Rod 47 with accurate threading and disposed parallel to shaft 46 is screwed to a portion of rotation stage unit 45. Rod 47 is rotatable in the forward and reverse directions by pulse motor 48, and linear moving means 49 of rotation stage unit 45 is formed by rod 47 and pulse motor 48. Further, encoder 53 that generates encoder pulses at regular intervals and at predetermined rotational phases by reading encoder slits is installed for detecting the rotation of rotation stage 41, and the encoder pulse signal is outputted to controller 50. Controller 50 further includes a clock means (not shown) therein that generates the reference clock signal used for the timing control.

Electron beam writing unit 40 further includes electron gun 23 that emits electron beam EB, deflection means 21, 22 that deflect electron beam EB in radial direction Y and circumferential direction X, as well as microscopically vibrating the beam back and forth in circumferential direction X with a constant amplitude, and aperture 25 and blanking 26 (deflector) as blanking means 24 for turning the radiation of electron beam EB ON and OFF. Electron beam EB emitted from electron gun 23 is irradiated on substrate 10 through deflection means 21, 22, a not shown lens, and the like.

Aperture 25 of blanking means 24 has a through hole in the center for passing electron beam EB, and blanking 26 operates according to input of ON/OFF signals, in which it passes electron beam EB through the through hole of aperture 25 during OFF-signal without deflecting the beam, while it blocks electron beam EB with aperture 25 by deflecting the beam so as not to pass through the through hole during ON-signal, so that electron beam EB is not irradiated. Then, while each element 13 is being written, OFF-signal is inputted to irradiate electron beam EB, and ON-signal is inputted during the transfer period between elements 13 to block electron beam EB so that exposure is not performed.

Drive control of spindle motor 44, that is, the rotational speed of rotation stage 41, pulse motor driving, that is, the linear movement of linear moving means 49, modulation of electron beam EB, control of deflection means 21, 22, ON/OFF control of blanking 26 of blanking means 24, and the like are performed based on control signals outputted from controller 50 serving as the control means.

Signal output unit 60 stores therein write data of fine pattern 12, such as address signal and the like, and outputs the write data signal to controller 50. Controller 50 performs the associated control described above based on the write data signal, and electron beam writing unit 40 writes fine pattern 12 on the entire surface of substrate 10.

Substrate 10 to be placed on rotation stage 41 is made of, for example, silicon, glass, or quartz and a positive or negative electron beam writing resist 11 is applied on a surface thereof in advance. Preferably, the power and beam diameter are controlled taking into account the sensitivity of electron beam writing resist 11 and the shape of each element 13.

Figure 4:
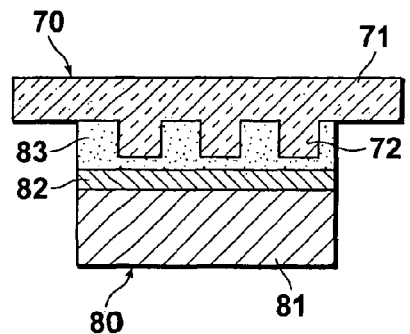
FIG. 4 is a schematic cross-sectional view illustrating a transfer-forming process of a fine pattern on a magnetic disk medium using an imprint mold having a fine pattern written by the electron beam writing method or fine pattern writing system.

FIG. 4 is a schematic cross-sectional view illustrating a process of transfer forming a fine uneven pattern using imprint mold 70 (uneven pattern carrying substrate) of the present invention having a fine pattern written by the electron beam writing method using fine pattern writing system 20.

Imprint mold 70 is obtained in the following manner. That is, resist 11 (not shown in FIG. 4) is applied on a surface of substrate 71 made of a transparent material and servo patterns 12 are written thereon. Thereafter, resist 11 is processed to form an uneven pattern of the resist on substrate 71. Substrate 71 is etched with the patterned resist as the mask, and then the resist is removed, whereby imprint mold 70 having fine uneven pattern 72 formed thereon is obtained. As an example, fine uneven pattern 72 includes servo patterns including address signals and groove patterns for a discrete track medium.

Magnetic disk medium 80 is formed by imprint method using imprint mold 70. Magnetic disk medium 80 includes substrate 81 on which magnetic layer 82 is stacked and resist resin layer 83 for forming a mask layer is provided thereon. The uneven shape of fine uneven pattern 72 is transfer formed by pressing fine uneven pattern 72 of imprint mold 70 against resist resin layer 83 and solidifying resist resin layer 83 by ultraviolet radiation. Thereafter, magnetic layer 82 is etched based on the uneven shape of resist resin layer 83 to form magnetic disk medium 80 of discrete track medium with the fine uneven pattern formed on magnetic layer 82.

The above description is a manufacturing process of a discrete track medium, but a bit pattern medium may also be manufactured through an identical process.

Figure 5A:
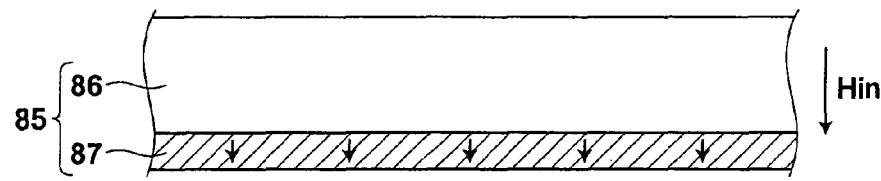
FIGS. 5A and 5B illustrate a transfer-forming process of a magnetic pattern on a magnetic disk medium using a magnetic transfer master having a fine pattern written by the electron beam writing method or fine pattern writing system.
Figure 5B:
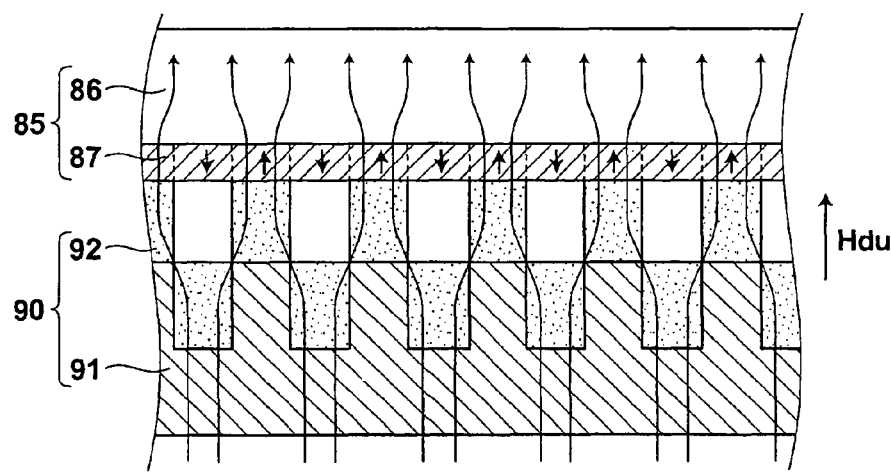
Figure 6:
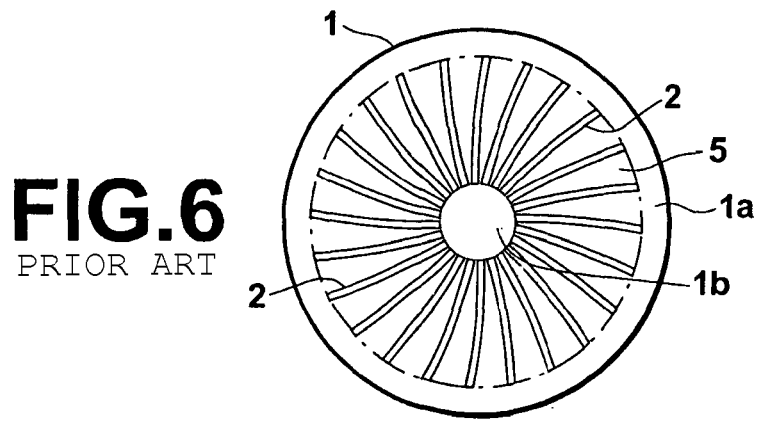
FIG. 6 is a plan view of an example fine pattern recorded on a magnetic disk medium, such as a hard disk.
Figure 7:
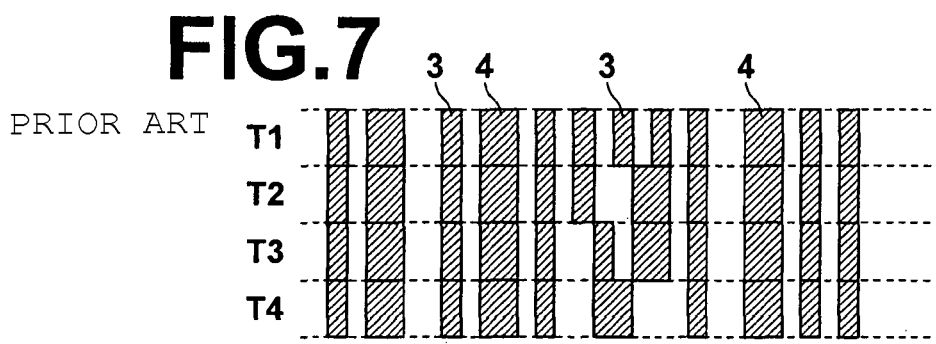
FIG. 7 illustrates an example fine pattern of address information converted by Manchester conversion.

FIGS. 5A and 5B are schematic cross-sectional views illustrating a magnetic transfer process of a magnetic pattern for manufacturing magnetic disk medium 85 using magnetic transfer master substrate 90 (uneven pattern carrying substrate) having a fine pattern written by the electron beam writing method using fine pattern writing system 20.

The manufacturing process of magnetic transfer master substrate 90 is substantially identical to that of imprint mold 70. Substrate 10 to be placed on rotation stage 41 is made of, for example, a silicon, glass, or quartz disk, and positive or negative electron beam writing resist 11 is applied thereon. Then resist 11 is scanned with an electron beam to write a desired pattern thereon. Thereafter, resist 11 is processed to obtain substrate 10 having an uneven fine pattern of the resist, which is an original master of magnetic transfer master substrate 90.

Next, a thin conductive layer is formed on the surface of the uneven pattern formed on the surface of the original master, and electroforming is performed thereon to obtain substrate 91 having an uneven pattern of metal casting. Thereafter, substrate 91 having a predetermined thickness is peeled off from the original master. The uneven pattern on the surface of substrate 91 is a reverse pattern of the uneven shape of the original master.

After grinding the rear surface of substrate 91, magnetic layer 92 (soft magnetic layer) is stacked on the uneven pattern to obtain magnetic transfer master substrate 90. The shape of a convex portion or concave portion of the uneven pattern on the surface of substrate 91 depends on the uneven pattern of the resist of the original master.

A magnetic transfer method using magnetic transfer master substrate 90 manufactured in the manner as described above will now be described. Magnetic disk medium 85 which is a medium to which information is transferred is, for example, a hard disk, flexible disk, or the like which includes substrate 86 having magnetic recording layer 87 formed on either one of the sides or on both sides. Here, it is assumed to be a vertical magnetic recording medium in which the easy direction of magnetization of magnetic recording layer 87 is perpendicular to the recording surface.

As illustrated in FIG. 5A, initial DC field Hin is applied to magnetic disk medium 85 in a direction perpendicular to the track surface in advance to initially DC-magnetize magnetic recording layer 87. Thereafter, as illustrated in FIG. 5B, magnetic transfer is performed by bringing the surface of magnetic disk medium 85 on the side of recoding layer 87 into close contact with the surface of master substrate 90 on the side of magnetic layer 92 and applying transfer field Hdu in a direction perpendicular to the track surface of magnetic disk medium 85 and opposite to the direction of initial DC field Hin. As the result, the transfer field is drawn into magnetic layer 92 of master substrate 90 and the magnetization of magnetic layer 87 of magnetic recording medium 85 at the portions corresponding to the convex portions of magnetic layer 92 of master substrate 90 is reversed, while the magnetization of the other portions is not reversed. Consequently, information (e.g., servo signal including address information) corresponding to the uneven pattern of master substrate 90 is magnetically transfer recorded on magnetic recording layer 87 of magnetic disk medium 85, whereby the magnetic disk medium 85 is preformatted. Note that, when performing magnetic transfer also to the upper side recording layer of magnetic disk medium 85, the magnetic transfer is performed at the same time with the magnetic transfer of the lower side recording layer by bringing the upper side recording layer and an upper side master substrate into close contact with each other.

The above described manufacturing method of the imprint mold or magnetic transfer master substrate using the electron beam writing method of the present invention is illustrative only. The method is not limited to this and any method may be used as long as it has a process of writing a fine pattern to form an uneven pattern using the electron beam writing method of the present invention.

What is claimed is:

1. An electron beam writing method for writing a fine pattern for a magnetic disk medium on a substrate applied with a resist and placed on a rotation stage by scanning an electron beam on the substrate while rotating the rotation stage, the fine pattern including writing elements having a track direction length greater than an irradiation diameter of the electron beam, wherein:
the fine pattern includes a short element corresponding to 1-bit signal length and a long element corresponding to 2-bit signal length in a mixed fashion, and the writing length of the long element is reduced by a predetermined ratio with respect to a final 2-bit signal length on the magnetic disk medium;

the writing of the fine pattern is performed by rapidly vibrating the electron beam back and forth in a direction orthogonal to a radial direction of the substrate and X-Y deflecting the electron beam in the radial direction of the substrate and the direction orthogonal to the radial direction while rotating the substrate in one direction, thereby scan controlling the electron beam so as to completely fill the shapes of the short and long elements in sequence; and when writing the long element, the electron beam is scanned with the middle position of the 2-bit signal length as the center position thereof so as to completely fill the area of the writing length reduced by the predetermined ratio, thereby writing the long element with an unwritten portion of predetermined width remaining on each side thereof with respect to the final 2-bit signal length on the magnetic disk medium.

2. The electron beam writing method as claimed in claim 1, wherein the long element is written by setting the amplitude of the back and forth vibration of the electron beam according to the entire writing length with the middle position of the 2-bit signal length as the center position thereof, and deflection scanning the electron beam once in the radial direction of the substrate.

3. The electron beam writing method as claimed in claim 2, wherein the amplitude of the back and forth vibration of the electron beam in the direction orthogonal to the radial direction is set by setting a writing signal reduced by a predetermined ratio with respect to the final signal length based on X-Y deflection signals in the radial direction and the direction orthogonal to the radial direction when the fine pattern is assumed to be written in the final signal arrangement on the magnetic disk medium.

4. The electron beam writing method as claimed in claim 1, wherein the long element is written by setting the middle position of a halved writing length divided at the middle position of the 2-bit signal length as the center position of the back and forth vibration of the electron beam, setting the amplitude of the back and forth vibration of the electron beam to one-half of the writing length of the long element, and deflection scanning the electron beam twice in the radial direction of the substrate.

5. A fine pattern writing system comprising:
a signal output unit for outputting a write data signal; and
an electron beam writing unit for scanning an electron beam, said electron beam writing unit configured for executing an electron beam writing method writing a fine pattern for a magnetic disk medium on a substrate applied with a resist and placed on a rotation stage,
the method performed by scanning an electron beam on the substrate while rotating the rotation stage,
the fine pattern including writing elements having a track direction length greater than an irradiation diameter of the electron beam,
the fine pattern including a short element corresponding to 1-bit signal length and a long element corresponding to 2-bit signal length in a mixed fashion, and the writing length of the long element being reduced by a predetermined ratio with respect to a final 2-bit signal length on the magnetic disk medium,
wherein the writing of the fine pattern is performed by rapidly vibrating the electron beam back and forth in a direction orthogonal to a radial direction of the substrate and X-Y deflecting the electron beam in the radial direction of the substrate and the direction orthogonal to the radial direction while rotating the substrate in one direction, thereby scan controlling the electron beam so as to completely fill the shapes of the short and long elements in sequence, and
wherein when writing the long element, the electron beam is scanned with the middle position of the 2-bit signal length as the center position thereof so as to completely fill the area of the writing length reduced by the predetermined ratio, thereby writing the long element with an unwritten portion of predetermined width remaining on each side thereof with respect to the final 2-bit signal length on the magnetic disk medium.

6. The fine pattern writing system as claimed in claim 5, wherein:
the electron beam writing unit includes a rotation stage movable in a radial direction thereof while rotating a substrate applied with a resist, an electron gun that emits an electron beam, a deflection means that X-Y deflects the electron beam in a radial direction of the substrate and a direction orthogonal to the radial direction and rapidly vibrates the electron beam in the direction orthogonal to the radial direction, a blanking means that blocks the radiation of the electron beam other than a writing area, and a controller that performs associated operation control of each of the means; and
the signal output unit is a unit that outputs a write data signal to the controller of the electron beam writing unit based on data corresponding to the form of a fine pattern to be written on the substrate, and wherein
the controller is a controller that scan controls the electron beam, when writing the long element, so as to completely fill the long element with the middle position of the 2-bit signal length as the center position thereof and the unwritten portion of predetermined width remaining on each side thereof with respect to the final 2-bit signal length on the magnetic disk medium.

7. A method for manufacturing an uneven pattern carrying substrate, comprising the steps of:
exposure writing a desired fine pattern on a substrate applied with a resist, the substrate placed on a rotation stage,
the exposure writing being performed by scanning an electron on the substrate while rotating the rotation stage,
the fine pattern including writing elements having a track direction length greater than an irradiation diameter of the electron beam, the fine pattern including a short element corresponding to 1-bit signal length and a long element corresponding to 2-bit signal length in a mixed fashion, and the writing length of the long element being reduced by a predetermined ratio with respect to a final 2-bit signal length on the magnetic disk medium,
wherein the writing of the fine pattern is performed by rapidly vibrating the electron beam back and forth in a direction orthogonal to a radial direction of the substrate and X-Y deflecting the electron beam in the radial direction of the substrate and the direction orthogonal to the radial direction while rotating the substrate in one direction, thereby scan controlling the electron beam so as to completely fill the shapes of the short and long elements in sequence, and
wherein when writing the long element, the electron beam is scanned with the middle position of the 2-bit signal length as the center position thereof so as to completely fill the area of the writing length reduced by the predetermined ratio, thereby writing the long element with an unwritten portion of predetermined width remaining on each side thereof with respect to the final 2-bit signal length on the magnetic disk medium; and forming an uneven pattern corresponding to the desired fine pattern on the substrate.

8. A method for manufacturing a magnetic disk medium, wherein the method uses an imprint mold produced through the steps of exposure writing a desired fine pattern on a substrate applied with a resist by the electron beam writing method as claimed in claim 1 and forming an uneven pattern corresponding to the desired fine pattern on the substrate to transfer an uneven pattern corresponding to the uneven pattern provided on the surface of the mold to the magnetic disk medium.

9. A method for manufacturing a magnetic disk medium, wherein the method uses a magnetic transfer master substrate produced through the steps of exposure writing a desired fine pattern on a substrate applied with a resist by the electron beam writing method as claimed in claim 1 and forming an uneven pattern corresponding to the desired fine pattern on the substrate to transfer a magnetic pattern corresponding to the uneven pattern provided on the surface of the master substrate to the magnetic disk medium.

* * * * *